United States Patent [19]
Dolgopolov

[11] Patent Number: 5,830,394
[45] Date of Patent: Nov. 3, 1998

[54] PROCESS FOR MAKING BUILDING PRODUCTS, PRODUCTION LINE, PROCESS FOR FIRING, APPARATUS FOR FIRING, BATCH, BUILDING PRODUCT

[76] Inventor: Vladimir Nikolaevich Dolgopolov, Anri Barbjusa, 11/2, kv.52, Kiev, Ukraine

[21] Appl. No.: 852,143
[22] PCT Filed: Oct. 22, 1990
[86] PCT No.: PCT/SU90/00238
§ 371 Date: Apr. 28, 1993
§ 102(e) Date: Apr. 28, 1993
[87] PCT Pub. No.: WO91/06514
PCT Pub. Date: May 16, 1991

[30] Foreign Application Priority Data

Oct. 30, 1989 [UA] Ukraine ................................. 4750973
Oct. 18, 1990 [UA] Ukraine ................................. 4872318

[51] Int. Cl.$^6$ .................................................. F27B 9/04
[52] U.S. Cl. .............................. 264/64; 264/66; 264/71
[58] Field of Search .................................... 428/688, 689, 428/697, 702, 703; 501/150; 264/56, 64, 66, 71

[56] References Cited

U.S. PATENT DOCUMENTS

| | | | |
|---|---|---|---|
| 1,131,463 | 3/1915 | Berry | 501/150 |
| 3,316,334 | 4/1967 | Walen | 501/150 |
| 3,434,855 | 3/1969 | Webb | 501/150 |

FOREIGN PATENT DOCUMENTS

| | | |
|---|---|---|
| 3204380 | 8/1983 | Germany . |
| 3501627 | 7/1986 | Germany . |
| 3539495 | 5/1987 | Germany . |
| 3637793 | 6/1987 | Germany . |
| 36678 | 10/1923 | U.S.S.R. . |
| 353402 | 11/1968 | U.S.S.R. . |
| 233511 | 12/1968 | U.S.S.R. . |
| 107385 | 10/1970 | U.S.S.R. . |
| 271730 | 9/1972 | U.S.S.R. . |
| 391372 | 7/1973 | U.S.S.R. . |
| 580120 | 11/1977 | U.S.S.R. . |
| 909494 | 2/1982 | U.S.S.R. . |
| 1057468 | 11/1983 | U.S.S.R. . |

OTHER PUBLICATIONS

Bazhenov, Yu M., "Concrete Making Practice", Yysshaya Shkola Pubishers, Moscow, 1978, p. 56.

Peregudov, V.V. et al., "Thermal Processes. . . ", Stroyizdat Publishers, Moscow, 1983, pp. 263, 271, 272, 276, 286, 287, 356.

Butt, Yu. M. et al., "General Practice of Silicate Production", Stroyizdat Pub. Moscow, 1976, pp. 94, 140, 229.

Onatski, S.P., "Production of Expanded Clay Aggregate," Publishing House for Literature on Construction Problems, Moscow, 1971, pp. 88, 109, 179, 208, 209, 217–219.

*Primary Examiner*—Timothy Speer
*Attorney, Agent, or Firm*—Ladas & Parry

[57] ABSTRACT

A method for making a building product from products of firing a clay-containing material and products of processing a lime-releasing material. The method comprises firing at least a clay-containing material up to at least beginning of its sinter, obtaining a molding mix comprising lime and products of firing a clay-containing material, molding a body of building product from the mix, and treating the body in a humid medium or in a medium containing water vapor. The products of firing a clay-containing material include a mixture of first and second portions that have been heated to respective first and second temperatures that are different from one another, the two different temperatures being within the temperature range from a temperature of beginning of dehydration to at least a temperature of sinter of clay, so that the products of firing comprise both products of dehydration and products of amorphization of clay.

21 Claims, 2 Drawing Sheets

PROCESS FOR MAKING BUILDING PRODUCTS, PRODUCTION LINE, PROCESS FOR FIRING, APPARATUS FOR FIRING, BATCH, BUILDING PRODUCT

The invention relates to the manufacture of building materials and may be used for making wall and other building products, e.g., brick and wall panels, preferably out of clayey raw materials. It can also be used for preparing batch mixtures, mortars and for other uses.

STATE OF THE ART

Most valuable building products from the point of view operational characteristics and architectural and aesthetic properties are ceramic brick or stones of clayey raw materials which are produced by preparing a raw material molding green body, drying it at 100° to 150° C. during 2 to 4 days, and firing at 900° to 1100° C. during 2 to 3 days. For producing, lining brick, either monomineral clays or loams have to be used, or clayey raw material should be homogenized and stirred which calls for high energy consumption with rather bulky production equipment. Inclusions of limestone or dolomite of a size larger than 1 to 2 mm in an amount exceeding 1 to 3% in this process are inadmissible as they result in destruction of fired bricks upon wetting. Long duration of firing is necessary to ensure curing of the brick during several hours under conditions where the brick surface is heated to a temperature not above the upper limit of the sintering range and the points most distant from the surrface of the brick are heated to at least the lower limit of the sintering range. The long time periods for temperature rise and temperature decrease during firing are necessary to avoid defects. These features result in a protracted production cycle lasting for at least 10 to 15 days, high thermal energy consumption for drying and firing, high material usage and cost of production equipment and as a result high brick cost.

Lower duration of production processes is characteristic of processes making use of the hydraulic hardening mechanism instead of pyrosilicate hardening. The main of these processes are as follows.

Processes of making silica brick, stones, and silica-concrete blocks involves forming green body from humidified mixture of quartz sand and lime, generally without adding other binders; autoclaving the resulting green body under saturated steam pressure of 0.8 to 1.6 MPa at 175° to 200° C. during 7 to 12 hours. These processes are characterized by the need to prepare lime in lime kilns, the need to use sand without harmful inclusions, e.g., clayey inclusions. In the majority of applications quartz sand is to be ground completely or in part. These processes are accompanied by dust. In addition to said features, these processes are characterized by necessity of employment the autoclaves and steam of high parameters. These lime-silica products have low aesthetic value deteriorating during operation. This is why constructions made from silica brick are either painted or lined. In silica brick, similarly to ceramic brick, cohesion with mortar deceases with an increase of frost-resistance, and vice versa since these parameters depend on accessible porosity on the product surface.

Building products are also manufactured on the basis of cement binders, e.g., Portland cement. Cement-based products are capable for hardening both under autoclaving and at normal temperature. However, preparing cement is associated with high fuel consumption for firing raw meal at temperatures about 1500° C. and with high energy requirements for fine grinding both carbonate and clayey raw materials and very strong clinker as firing product. Production and application of cement are associated with a strong dust lading of air. Production equipment is characterized by a high material usage, especially for the construction of lined kilns. Cement-based products are also of a low aesthetic value if used without supplementary finishing.

In addition to said processes, known in the art are other processes involving the use of compositions or components containing clayey raw materials or products of their processing:

- it is known that [1] clays and loams are hydraulically active in the presence of lime only under autoclaving conditions and are inactive at normal temperature;
- it is known that [1] finely ground burnt rocks, fuel ashes, and clayey components of brick cement (products of clay firing at a temperature below 800° C.) are active in the presence of lime both under autoclaving and at normal temperature;
- it is known that [2] clayey rocks fired at 500° to 600° C. are most active, and those fired at 800° to 1000° C. are much less active;
- lime and burnt-clay binders (brick cements) are also known [2,3];
- lime and slag binders are known [1] which contain a substantial amount of vitreous aluminosilicates;
- lime and belite binders [3] are prepared by firing at 1000° C. to 1200° C. natural or artificial limestone and silica or limestone and clay mixtures;
- Portland cements with mineral additives are known [1,3], the additive being in form of burnt rocks and ashes.

All the above mentioned binders should be finely ground which causes their high water demand. They change in volume under hardening. Lowering water demand and smaller dimensional changes achieved by adding normal aggregates (as in the case of cement-based concrete) cannot be used for hardening without autoclaving since no-cement binders do not react with generally used aggregates of any particle size. Besides, this is inefficient.

It is known to prepare chamotte and lime products [4] by using clay and limestone firing at 950° to 1000° C. wetting firing products and finely grinding them, forming a product and autoclaving it under 0.8 to 1.6 MPa. One of the embodiments of this process involves adding to 10 to 30% of nonfired clay which is assumed to cause an increase in density of green body and finished product, a decrease in open porosity, and enhancement of frost-resistance. In another embodiment of this process, nonfired clay or a part of it is added in the form of slip.

Known in the art is a production line [5] for carrying out this process, with burn-out additives introduced into a mixture of clay and limestone fired in a rotary kiln.

This process [4,5] is used for making products similar to silica brick. Quartz sand here is replaced by finely ground ceramic sand, and a binder is in form of lime, raw clay, and comminuted ceramic fines. This process allows a product to be obtained with heightened frost-resistance and with high aesthetic value identical to that of lining ceramic brick since the raw material is repeatedly homogenized and stirred during production cycle. This process allows undergrade clayey raw material with high content of coarse carbonate inclusions up to 20% and greater to used which cannot be used in the conventional ceramic production processes. This process lowers energy consumption and material usage for the construction of equipment owing to a reduction of the cycle duration to 20 to 30 hours. In addition, there is no dust lading of the air in using this process. This process seems to be most similar to claimed inventions.

At the same time, this process [4,5] has certain fundamental distinctions including the need to use a lined rotary kiln with high dust losses and substantial fuel consumption, emissions of sulfurous compounds available in both raw materials and fuel. This process also calls for autoclaving with normal pressure of about 0.8 MPa. All this results in high material usage of equipment and high energy requirements.

The need of autoclaving with high steam parameters is caused by the fact that aluminosilicate components of the binder, namely, nonfired clay and ceramic sand (product of firing at 1000° C.) are active enough in the presence of lime only under autoclaving.

State of the art shows the following: all processes for making building products and mortars are characterized by the fundamental feature, namely, by the use of kilns which are lined for a temperature of at least 1000° C.; a number of processes in making hydraulically hardening products are characterized by the use of autoclaves with high-parameter steam; high material usage of equipment and high power requirements associated with mentioned above and other features of the processes.

The claimed inventions are aimed at bringing solutions of the following problems:

lower material usage of equipment and energy consumption owing to: preparation of batches and manufacture of products for which autoclaving and high-parameter steam are not necessary for hardening; elimination of the need to use lined kilns at all stages of the production process.

enhanced operation properties of products, including: architectural and aesthetic properties, frost resistance, cohesion with mortar.

SUMMARY OF THE INVENTION

The common inventive concept of the inventions claimed here resides, in the first place, in the fact that a batch for preparing hydraulically hardening building products contains products of different-temperature processing of raw materials; the raw materials consisting of, or containing a clayey or a clay-like component; and by this fact the elimination of the need to use autoclaves and high-parameter steam is reached. This approach is based on the following.

During heating, chemical and physical and chemical processes occur in a clayey substance which develop in minerals proper and in admixtures, as well as a result of reactions of products of decomposition of clay-forming minerals with admixtures and products of decomposition of admixtures. The following processes among those are decisive for our case:—oxidation of natural organic substances at 300° to 400° C.;—turning of oxide iron form to ferrous oxide, which is highly reactive, beginning with 350° to 500° C. in particular, under the effect of carbon from admixtures;—dehydration of clayey minerals begins at 450° to 600° C., with the elimination of chemically bound water, and the material acquires high chemical activity, with some hydroxyl groups still remaining in the material; —the dehydrated product starts decomposing with the release of amorphous silica at 700° to 800° C.;—crystal lattice of the minerals is broken at 880° to 950° C., in the exothermal effect area, with the removal of hydroxyl groups, formation of free oxides, rearrangement of the lattice, breakage of the layer of tetrahedrons, and partial change the coordination of ions;—primary eutectics (beginning of sinter) are formed, generally, from 700° to 900° C. owing to the admixtures;—at higher temperatures, generally above 900° to 950° C., formation of primary mullite begins (partial sinter) as a result of which the product becomes water resistant, frost resistant and strong formation which is actually present in the body of conventional ceramic brick;—further increase of temperature above 1100° to 1200° C. results in a beginning of melt being formed (complete sinter);—if there are oxides of alkali metals such as calcium oxide or their carbonates in the clayey raw material, calcium aluminates, aluminoferrites and silicates are formed beginning with 900° C. The actual picture is more complicated; mentioned effects occur at different temperatures in different clayey minerals with different admixtures. They, however, generally take place within the above mentioned temperatures.

The most hydraulically active among products of heating of clayey substance are: products of dehydration; free iron oxides; products of amorphization as products of heating at 880° to 950° C., but not up to sintering, which can be active even without presence of lime or cement. Properties of the products of hardening may be improved by adding to the molding mass an admixture of a ceramic phase (a product of firing at 900° to 1100° C.) of a certain particle size, preferably with an optimum grading factor which ensures the most dense packing. The surfaces of cleavage of the ceramic phase have a high open porosity which is the result of the internal porosity of the intact ceramic phase. The pillars between open pores terminating in the cleavage surface are very active under non-autoclaving conditions. This high activity only takes place in contact with a substance which is active under normal conditions and not only under autoclaving. This is also due to the fact that cleavage is most likely to take place at the vitreous phase which is less strong than the crystalline newly formed structures and is hydraulically more active.

Activity of batch for molding according to this invention is enhanced additionally thereof in a case when the different-temperature phases are available in it, and in the first place, products of dehydration (about 500° to 600° C. and up to 800° C.) and products of amorphization (about 880° to 950° C.) since these components have, as shown above, different mechanisms of physical and chemical surface activity, and thereby their contact with each other is most effective in comparison with a single-temperature phase which results in an increase in density, strength and frost resistance of the product and also allows molding moisture content to be lowered.

Thereby, from the above, the best batch for making products is the one containing fine dehydrated and amorphous phases and a ceramic filler of different particle sizes, as well as an alkaline additive as a binder component, e.g., lime. A mixture containing two of the above mentioned aluminosilicate components may also be used.

The content of each component in the batch may vary:

if a non-finely divided ceramic component (aggregate) is available in the mixture, the content of rest of components depends on the volume of voids between the grains of the aggregate and may range from 10 to 40%;

in case there is no ceramic or other aggregate in the mixture (which is also true of finely divided phases in the former case with the aggregate), the amount of an alkaline additive in the finely-divided phase may vary from 10 to 60% depending on the desired properties of the finished product and fineness of each component. With an optimum grading factor of the aggregate, it may be as low as 2%;

if there are both amorphous and dehydrated components in the mixture, the amount of each of them may largely vary.

If each of different-temperature phases is a product of thermal treatment of one and the same clayey mineral, this will give an additional result since when calcium hydroaluminosilicates are formed, as well as other formations, distortions of silicon and oxygen elements and other components of the structure either disappear or are negligible so that the height of a thermodynamic barrier hindering the development of the chemical reactions between the components is lowered.

This approach allows to prepare a batch with substantially lower cost of thermal treatment of raw materials, and this batch may be used, as distinguished from prior art [4,5], for making products hardening under humid conditions or in a medium containing water vapor either at normal temperature, or under steaming at normal pressure, or under autoclaving with a substantial reduction of autoclaving duration. All this results in a lower material usage for making production equipment and a decrease in power requirements.

If a carbonate, e.g., limestone is available in, or added to clayey raw materials, the fired product will contain highly active formations as well, which are characteristic of cement, however it is unnecessary to add cement.

The batch for molding may also contain up to about 5 to 15% of nonfired clayey phase. Being plastic and finely divided, clayey phase enhances moldability of the mixture, increase density and improve other characteristics of the product, but the availability of and increase in the content of this clayey phase call for an increase in the humid treatment temperature.

A new composition of batch for molding according to the invention has, in addition to above mentioned useful properties, other valuable distinction:

products prepared from these compositions have improved cohesion wit mortar owing to chemical reactions between dehydrated and/or amorphous phases available on the product surface and Portland cement of the mortar, in particular, calcium hydroxide released as a result of hydration of Portland cement of the mortar;

finely divided phases, and in the first place, dehydrate have, in comparison with ceramic phase, and the more so with raw clay, a much more intense color owing to dyeing with iron oxides so as to enhance architectural and aesthetic properties of products;

products or mortars consisting of, or containing a mixture of different-temperature phases have enhanced frost resistance owid to the following factors:—possibility of lowering of molding moisture content;—possibility of lowering of open porosity of products by using humid thermal treatment under atmospheric pressure or under a low surplus pressure to replace autoclaving, because autoclaved product are known to have long open pores and capillaries which are formed at the end of the autoclaving owing to intensive migration of moisture within the product towards its surface.

These properties are inherent in cement-based concrete if the mixture according to the invention is added as an additive to a concrete. Resistance of such concrete in a number of aggressive media is higher than when pozzolana or slags are added.

A mixture of different-temperature phases may be obtained by mixing components prepared individually at respective temperatures. An additional lowering of power requirements may be achieved by using heat released in preparing a higher-temperature phase for thermal treatment with the aim of preparing another or other temperature phases, e.g., gases exhausted from rotary kiln for dehydration of respective part of clayey raw materials, e.g., in a high-temperature drier.

Lime or another alkali-containing or alkali releasing component may be added to batch for molding after firing the clayey component. It is better to make use of a step of the prior art process [4,5] in which a natural or artificial mixture of clay and limestone is fired.

Separate preparation of different-temperature phases is worse from the manufacturing point of view since it calls for the use of several thermal units. Further decrease in weight of production equipment and rational heat utilization may be obtained by firing all clayey or clayey and carbonate raw materials in one and the same unit, by providing a non-stationary temperature field in the mass of raw materials, with a preset temperature gradient. This approach may be implemented, e.g., by supplying the mass of raw materials into a slit-type tunnel kiln or to a shaft furnace having gas or other burners placed along the perimeter of its middle part. The temperature gradient is thus directed to the zone outside the raw material mass, and thermal flux is directed into the interior of the raw material mass. As a result of such firing, its product will be in the form of mixture of different-temperature phases.

Solution of second of main problems, namely elimination of the need to use lined kilns, is achieved by creating in the mass of raw materials a non-stationary temperature field with a temperature gradient directed into the interior of the raw material mass, by directing the thermal flux from the interior of raw material mass to outside of the raw materials. This step can be implemented by heating the interior of the fired mass up to a maximum temperature of, e.g., up to 900° to 1100° C., and so as the outer part of the mass transforming in the form of dehydrated clay, or non-dehydrated dried clay; it results in rejecting heat-resistant lining and replacing it with a thin casing, e.g., of a metal sheeting which can also be eliminated with in certain applications. As will be shown later, it is preferred to implement this step by heating the interior of the raw material mass placed in a shaft (similar to a shaft furnace). A heat carrier, e.g., a gas can be introduced into the central part of the shaf. If a solid fuel is used or the use is made of a raw material containing a solid fuel component such as wastes of coal recovery or thermal utility wastes, it is more preferably to place the fuel-containing raw material into the central part of the shaft cross-section, and a raw material that does not contain a solid fuel component is placed in the zones adjacent to the shaft walls.

Placing a clayey component in the wall zone of the shaft lowers a wear of the shaft during its operation since nonfired or dehydrated clay has a low hardness which is also important in making use of a conventional shaft furnace for carrying out the process according to the invention.

If a solid fuel component is available in the raw mixture, introducing air into the area of the mixture which is at the maximum temperature or into the area of the firing zone adjacent to the heating zone ensures an additional protection of the shaft against thermal influence and also provides for afterburning of carbon oxide and lowering of its emissions.

In the prior art process [5] firing is carried out in countercurrent which has its manufacturing advantages. However, since sulfur is available in fuel and/or in burning additives, sulfur dioxide is released into atmosphere, and the release of sulfur dioxide from the solid fuel component begins, generally, in the preheating zone. This component is removed from the kiln together with other gases. Firing of clayey, carbonate and solid fuel granules by said method lowers emissions of sulfur dioxide, but this reduction is insignificant. If the firing is carried out in co-current in a rotary kiln or in a shaft furnace or/and firing products are placed, before molding of a product, in off gases of the furnace, the reaction between sulfur dioxide available in the gases with lime which is reactive towards such gases results in the formation of calcium and/or magnesium sulfates, i.e., gypsum. The presence of gypsum in the mass for molding enhances strength, frost resistance and air resistance of the product, accelerates hardening or gives additional lowering the parameters of humid thermal treatment.

Green body may be molded by any appropriate method including pressing, tamping, vibration, rolling, and by other methods. Product quality is enhanced when molding is carried out under vibratory conditions as the ceramic phase of the fired products have a large number of open pores. By vibrating of humid molding mass, a moisture gets out of open pores, an intensive stirring of components takes place and humid mass fills up the pores again when the vibratory treatment is suspended.

Fired products are subjected to fine comminution (grinding) in the prior art processes [4,5]. This mixture has a high final porosity because of a high molding moisture content and other disadvantages. It is preferred that ceramic phases act as a aggregate with an optimum grading factor, the rest of the phases being comminutes to fractions smaller than 0.1 to 0.2 mm; i.e., it is preferred that the fired products be partly comminuted. This can be achieved by combined comminution of all components with the attainment of the desired fineness of nonceramic phases owing to the abrasive effect of a harder ceramic component. The majority of prior art apparatuses for comminution of materials ensure comminution which is selective in terms of strength and hardness. Rotary crushers are known to provide maximum selectivity. Different phase are preferably comminuted separately, e.g., a ceramic product of firing to a size smaller than 5 to 10 mm and dehydrated and amorphous phases by fine grinding to a size below 0.1 to 0.2 mm.

In carrying out firing of raw materials in an apparatus of a shaft type, raw mixture or raw components may be placed into the shaft without any preparation. If the raw materials are preliminarily pelletized before placing into the shaft, aerodynamic drag of the raw materials layer is substantially reducing owing to identical size of raw material particles; it also allows to simplify the sealing devices of gas supercharge and draft systems. In addition, more favorable conditions for the occurrence of reactions between components obtain within the pellets.

The batch according to the invention, as mentioned above, is capable of hardening under autoclaving as well as under nonautoclaving conditions. Under autoclaving, product strength is enhanced. Additional lowering of material usage for production equipment can be achieved by carrying out a two-stage treatment of a product: first under atmospheric pressure at water vapor temperature of 30° to 100° C. during 4 to 10 hours then in an autoclave at a temperature of, e.g., 115° to 200° C. during 3 to 6 hours. This technique allows products of enhanced strength to be made at high autoclave throughput capacity.

EMBODIMENTS OF THE INVENTION

Figure 1:
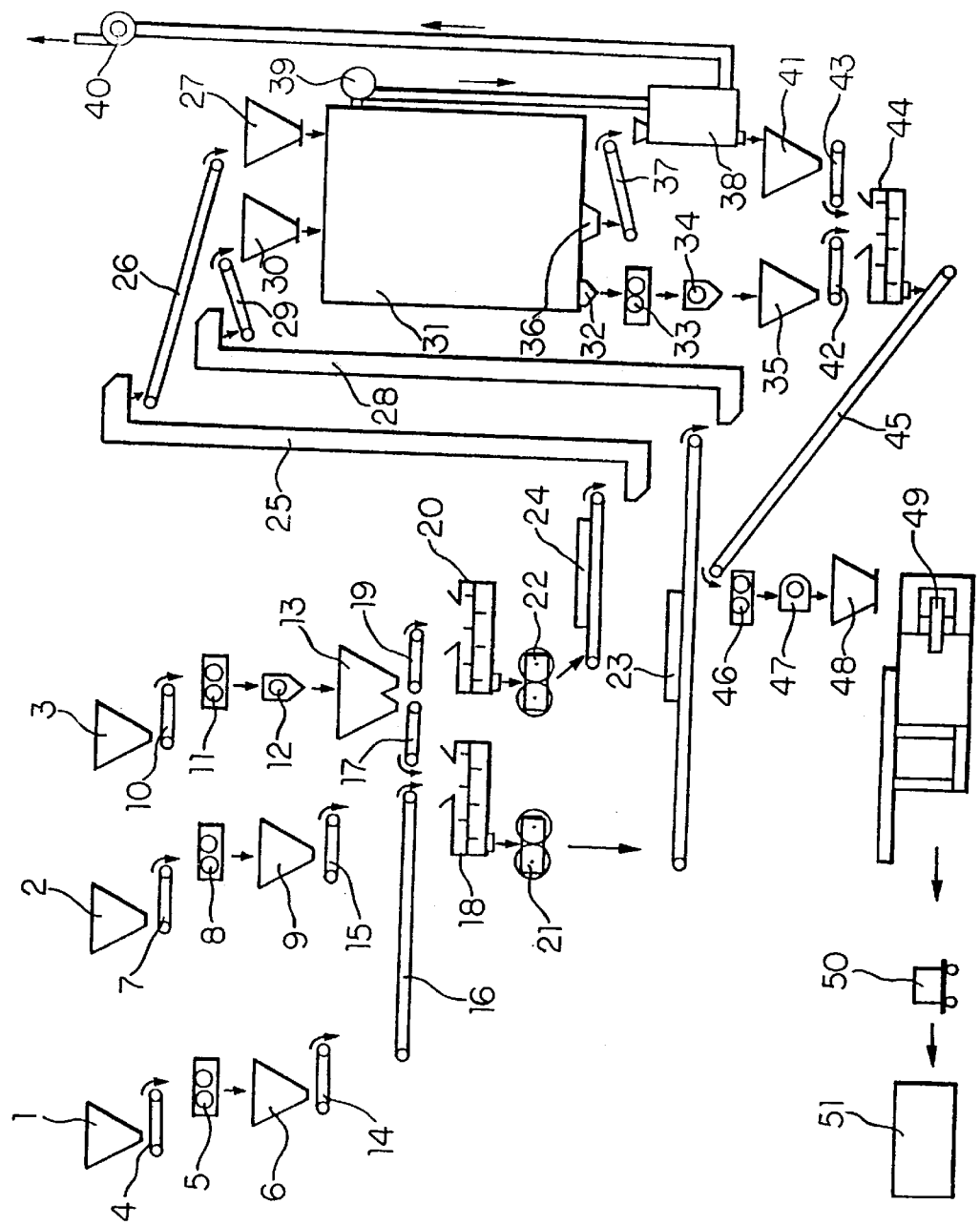
FIG. 1 schematically shows a preferred version of embodiment of a production line for manufacturing building products according to the invention.

The best way of carrying out a process for making building products is implemented by using a production line shown in FIG. 1. Raw material and fuel components are supplied to the production site by conventional techniques and are charged into storage hoppers 1, 2 and 3 for coal, limestone and clay, respectively. Coal or another solid fuel component is supplied by means of a feeder 4 to a roll crusher 5 which grinds the coal to a particle size below 2 to 3 mm, whereafter the coal is fed to a hopper 6. Limestone is supplied by means of a feeder 7 to a roll crusher 8, and the cruched limestone of a size less than 5 to 10 mm is fed to a hopper 9. Clay (or loam) is fed by means of feeder 10 to coarse grinding rolls 11 and then to a disintegrator 12 for comminution, and the clay is then fed to a hopper 13. Coal and limestone by feeders 14, 15 and by a conveyor 16 and clay by a feeder 17 are supplied to a mixer 18 having damper where the components are mixed and wetted to a moisture content of 15 to 20%. The clay is supplied by a feeder 19 to a mixer 20 having a damper, where the clay is homogenized and wetted to a moisture content of 15 to 20%. After mixers 18 and 20, the mass is supplied to pelletizers 21 and 22 of any appropriate known type. The resulting pellets of 10 to 30 mm (the pellets from clay are preferably of a smaller size) are fed to conveyor driers 23, 24 in which their moisture content is lowered to 4 to 12%. Pellets from clay are supplied by an elevator 25 and conveyor 26 to a loading hopper 27. Pellets from mixture (of clay, limestone and coal) are supplied by an elevator 28 and conveyor 29 to a lading hopper 30. Feeders 14, 15, 17, 19 and conveyor 16 work in such a manner that coal content in the pellets from the mixture be from 2.5 to 4.5% by weight depending on caloric capacity of coal and limestone content be from 5 to 20% depending on other process parameters and the ratio of mass of mixture pellets to clay pellets is preferably from 90:10 to 65:35. Hoppers 27, 30 are loading hoppers of a firing unit 31 which is shown in greater detail in FIG. 2. Mixture pellets are fired in firing unit 31 owing to the presence of coal in the pellets at a temperature of preferably 900° to 1100° C., and clay pellets are heated up to temperatures below of said maximum temperature owing to heat released from firing of the mixture pellets. After the firing, clay pellets from a hopper 32 are crushed in a roll crusher 33 and comminuted in a disintegrator 34 to a particle size smaller than 0.1 to 0.2 mm and are fed to a hopper 35. After firing the mixture pellets are supplied from hopper 36 by a conveyor 37 to an absorber 38 where they adsorb sulfur dioxide and also carbon dioxide from off gases removed from unit 31 through a smoke exhauster 39 and the gases are then expelled by a smoke exhauster 40, and the mixture pellets are discharged into a hopper 41. The components are then supplied by batchers 42, 43 to a mixer 44 having a damper for preparing a molding mass with a moisture content of 5 to 15% depending on molding method and equipment. The mixture is then supplied by a conveyor 45 to roll crusher 46 and then to a rotary crusher 47 for agitating and then to a molding mass hopper 48 of a semi-dry press 49 in which brick or blocks are pressed at a specific pressure of 15.0 to 25.0 MPa. An automatic charger of the press removes green brick from the press worktable and places it on a car 50 which is moved to a chamber 51 of humid thermal treatment. This chamber may be in the form of a steaming chamber, or a low-pressure chamber, or an autoclave, where products are treated during 3 to 15 hours depending on steam parameters. The resulting products have a strength of 10.0 to 15.0 MPa and higher, frost resistance over 25 cycles, water absorption of 12 to 17%. All components of the production line, except for unit 31, are well known and are used in the manufacture of building materials, and absorber 38 is used in the chemical industry. If a low-sulfur coal is used, this adsorber may be dispensed with, and the content of limestone in the raw mixture can also be lowered in this case.

Figure 2:
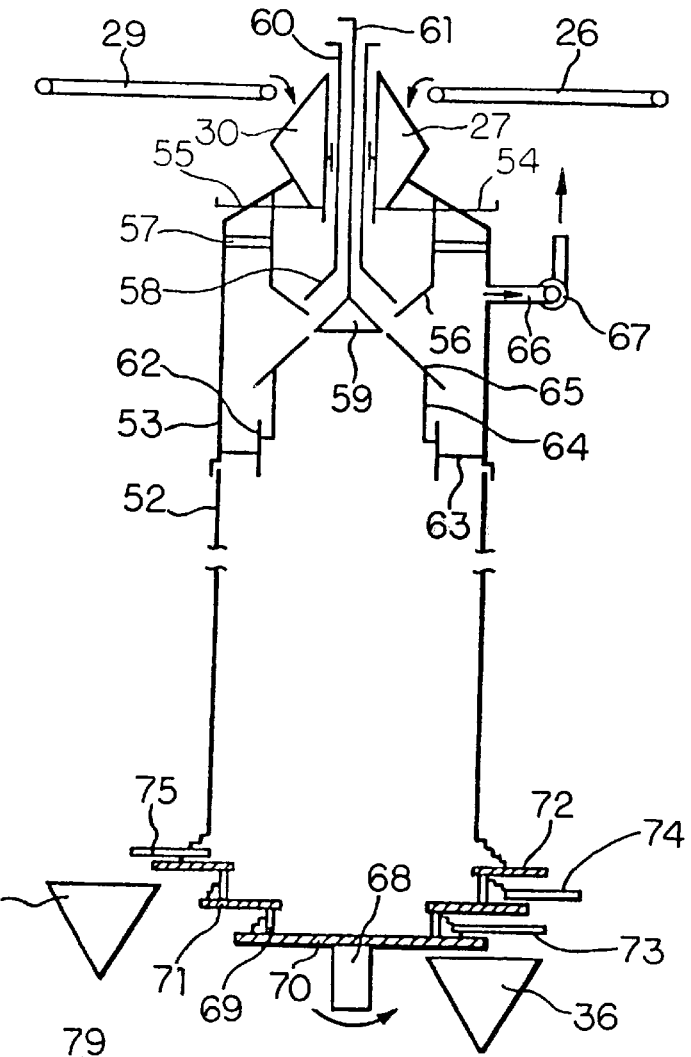
FIG. 2 shows a version of an embodiment of an shaft-type apparatus without a fire-proof lining for preparing a batch according to the invention, which is incorporated in the production line of FIG. 1.

An embodiment of a firing apparatus shown in FIG. 2 comprises a shaft 52 which is made, e.g., out of thin medium-grade steel sheet. The shaft has in its top part a unit for separate charge consisting of a casing 53 accommodating loading hoppers 27, 30 with batchers 54, 55 connected to their drives, an intermediate hopper 56 mounted on posts 57, movable cones 58, 59 connected by means of tie members 60, 61 to drives, a partition wall 62 in the form of a ring attached to posts 63. The ring supporting posts 64 on which a immovable cone 65 is mounted. Casing 53 is connected to a flue 66 having a smoke exhauster 67. A unit for separate discharge is provided under a discharge opening of shaft 52 and has a drive shaft 68 with posts 69 supporting rotating discs 70, 71, 72 mounted above one another. Lower disc 70 is continuous, and each of the other discs has a central opening. The diameter of discs 71, 72 decreases in steps towards continuous lower disc 70. The diameter of the central opening of each disc 71, 72 also decreases in the same manner. Tripping scrapers 73, 74 are provided adjacent to discs 70, 71, and hopper 36 is mounted under the scrapers. A tripping scraper 75 is mounted adjacent to disc 72, and hopper 32 is mounted under this scraper. The apparatus may have a larger number of the discs, each having at least one scraper. Immaterial elements of the apparatus, including supports of the shaft, hoppers, scrapers, and drive shaft, as device for rotating the drive shaft (drive) are not shown as they may have various appropriate known modifications.

The apparatus shown in FIG. 2 functions in the following manner. Clay pellets from hopper 27 are supplied by batcher 54 under the action of a drive into intermediate hopper 56. Tie member 60 is driven to raise movable cone 58 so that clay pellets spill over cones 59, 65 into the space between shaft 52 and cylindrical partition wall 62, whereafter cone 58 is lowering into its initial position. Mixture pellets are supplied from hopper 30 by batcher 50 under the action of tie member and drive (not shown) into intermediate hopper 56. Tie member 61 moves movable cone 59 down, then the tie member 60 raises movable cone 58 so that mixture pellets spill over inside partition wall 62, and then the charging cycle is repeated. Firing of mixture pellets occurs in shaft 52 owing to the coal available in the pellets similarly to a process in a normal shaft furnace. During the process the clay pellets are subjected to the influence of temperatures (which are below the mixture pellets temperature) decreasing in the direction towards the wall of shaft 52 through heat transference from the mixture pellets. The temperature acting upon the shaft wall depends on the duration of firing of the mixture pellets at the maximum temperature, on the amount of space between partition wall 62 and shaft 52 which may vary depending on the desired composition of fired products and phases ratio and other factors, the space can be preferably of 40 to 100 mm. Smoke exhauster 67 ensures optimum conditions of gases movement through the pellets layer determined following well-known rules. The pellets descend towards the discharge opening of shaft 52 and are cooled with sucked air. The clay pellets get onto disc 72 having the diameter of its central opening which is close to the diameter of partition wall 62. The mixture pellets get onto discs 71, 70. During rotation of shaft 68 clay pellets are tripped by scraper 75 into hopper 32 and mixture pellets are tripped by scrapers 74, 73 into hopper 36 From the hoppers pellets are fed for further treatment as shown in FIG. 1 or for being otherwise used.

Devices for separate charging and discharging may be of any other type, provided they can perform the above described functions. The device for separate charge may also be in the form of a double rotatable chute having one discharge opening located over the space between schaft 52 and partition wall 62 and another opening located within the partition wall 62. In this case the partition wall may be dispensed with if a chute rotation mechanism is synchronized with a discharge mechanism of the schaft. Shown in FIG. 2 the separate discharge device is a modification of a prior art device [6] which was intended for different purposes. Another methods for separating mixture pellets and clay pellets without using an separate discharge device, e.g., by preparing pellets of different size in pelletizers 21, 22, discharging all pellets from the shaft, and screening the pellets into fractions. Since clay pellets of smaller size are located adjacent to the shaft walls, spurious draft in this area decreases since the layer of pellets of larger size in the central part of the shaft offers a lower aerodynamic drag to the gas flow. As shown above, clay pellets and mixture pellets can be comminuted together. In using the process according to the invention for preparing Portland cement clinker simultaneously with the preparation of an active hydraulic additive to the cement separate discharge is not required either. In this case, a discharge device may be in the form of any device generally used in shaft furnaces for the production of cement clinker.

In a shaft-type apparatus for firing raw materials use may be made of different energy carriers such as gas. Fuel burning devices are well known in the art. The shaft may be provided with one or several bottom burners located in the bottom part of the shaft, preferably at the center of its cross-section. The shaft may be provided with beam burners positioned on one or several beams, preferably in the central part of the shaft cross-section and in the vertically middle part of the shaft. A burner (or a plurality of burners) may also be provided in the central part of the cross-section of the top part of the shaft, a supercharge device instead of a draft device being provided in the top part of the shaft in this case. This design allows one of the embodiments of the row materials firing to be carried out in co-current.

The creation within the raw mass moving through shaft of a temperature gradient directed into the interior of the mass can also be achieved by using different techniques, e.g., by making gas permeable openings in the shaft wall along its perimeter. Air admitted through the openings owing to a pressure reduction provided by the gas exhauster counteracts the thermal flux directed towards the shaft wall. The openings, which are preferably controllable, may be made at different levels vertically along the shaft, the opening levels may corresponding to the position of the zone where the mass temperature is at its maximum.

Figure 3:
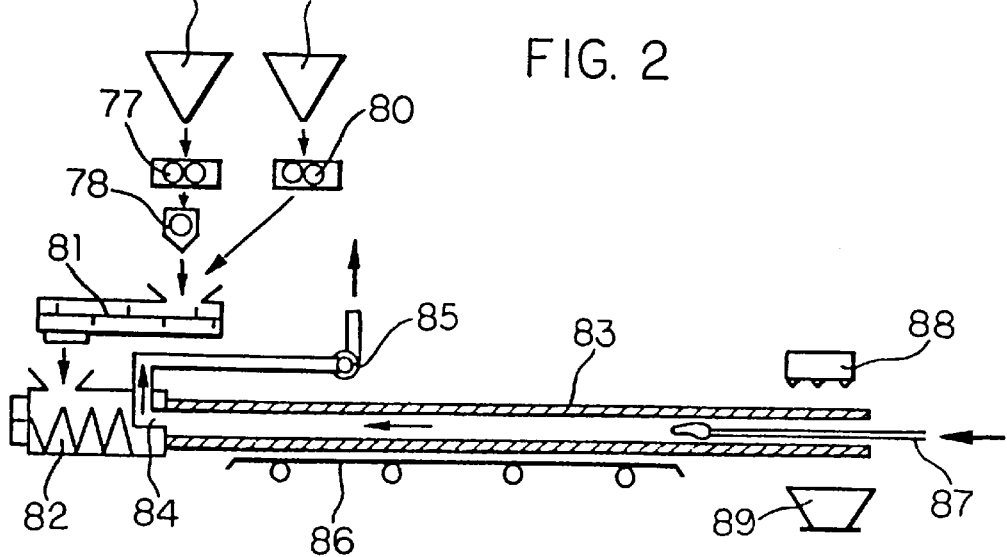
FIG. 3 shows a version of an embodiment of firing of a raw material mass from the interior thereof.

One embodiment of the process for firing the mass from the inside is shown in FIG. 3. Clay from a hopper 76 is supplied to coarse griding rolls 77 and disintegrator 78. Limestone from a hopper 79 is supplied for comminution into a roll crusher 80. The resulting components are fed to a mixer 81 having a damper in which the mixture is stirred and wetted to a moisture content of 15 to 20% and from which it is supplied to an extruder 82 for forming a tubular member 83 by means of a core 84 having an internal axial passage connected to a draft device 85 to ensure movement of a gaseous fluid through the interior of tubular member 83 moving along a conveyor 86. A gas or other burner 87 is provided inside tubular member 83 on some depth. The temperature of heating of the inner part of the tubular member is determined by the burner flame temperature. The temperature of the outer part of the tubular member depends on thickness of the member wall, temperature of the burner flame, velocity of movement of the member along the conveyor, and other factors. Different-temperature phases of clayey substance are formed through the thickness of the member wall. Longitudinal projections or cavities may be provided on the inner and/or outer surface of tubular member by providing a respective configuration of the die and core of the extruder so as to ensure an additional control of the ratio of different temperature phases in the fired product. Moisture from a damper 88 causes destruction of the fired member because of quenched particles of lime, and fragments of the member fall down into a hopper 89. Several tubular members at a time may be formed.

The extruder may also form a clay member of tubular or like shape of unclosed cross-section, and a longitudinal cavity is formed in such member into which a stationary heater may be inserted, e.g., an electric heater. The extruder may also form several rectangular-section (or like) members running in parallel with one another, the heaters being positioned in spaces between them. This technique is used to implement the outer heating of the raw mass.

The heating of the interior part or preferably interior part of the mass may also be carried out using different technique principles, e.g., by using high-frequency current for internal dielectric heating of the raw mass as it is used in firing clay for producing expanded clay with a such difference that thermal action is carried out, e.g., in two mutually perpendicular directions, by placing around the raw mass two pair of plates of a pair of high-frequency capacitors.

The main rules dealing with methods for making choice of grading composition of molding masses are well known and applicable to the implementation of the claimed inventions.

I claim:

1. A method for making a building product from products of firing a clay-containing material and products of processing a lime-releasing material, which method comprises firing at least a clay-containing material up to at least beginning of its sinter, obtaining a molding mix comprising lime and products of firing a clay-containing material, molding a body of building product from said mix, treating said body in a humid medium or in a medium containing water vapor, characterized in that the products of firing a clay-containing material comprise a mixture of first and second portions that have been heated to respective first and second temperatures that are different from one another, the two different temperatures being within the temperature range from a temperature of beginning of dehydration to at least a temperature of sinter of clay, so that the products of firing comprise both products of dehydration and products of amorphization of clay, and further characterized in that the molded body is treated under treatment conditions selected from the group consisting of heating at a temperature of about 30° to 100° C., heating in a steaming chamber, treating in a low-pressure chamber, and heating in an autoclave at a sufficient autoclaving temperature of about 115° C.

2. A method for making building product as claimed in claim 1, wherein the clay-containing material is being fired together with said lime-releasing material, so as to obtain said products of firing a clay-containing material and lime, and products of such a firing are placed before molding into the medium of the firing gases.

3. A method for making building product as claimed in claim 1, wherein both clay-containing material and lime-releasing material are together fired in co-current.

4. A method for making building product as claimed in claim 1, wherein through a firing the clay-containing material and crushing product of this firing a ceramic sand is obtained which sand has open pores, then a mixture containing said porous ceramic sand is molded into the body of finished product under vibratory conditions providing that moisture leaves said process and afterwards a moistened mass containing said at different temperatures fired products fills said pores.

5. A method for making building product as claimed in claim 1, wherein the body of finished product is treated first under atmospheric pressure at a temperature of about 30° to 100° C. during about 4 to 10 hours and then in an autoclave at a temperature of about 115° C. for a duration of about 3 hours.

6. A method as claimed in claim 1 wherein said first portion of the material has been heated to a temperature between about 500° to 800° C. and the second portion has been heated to a temperature between about 880° to 950° C.

7. In a method for making a building product from a clay-containing material, wherein the material optionally has a content of limestone or dolomite, the method comprising:
   a) firing the clay-containing material by heating to at least a beginning of sinter of clay, whereby to form products of firing the clay-containing material comprising ceramics,
   b) forming a molding mix comprising lime and the products of firing the clay-containing material,
   c) molding a body of building product from said mix, and
   d) moist curing the body at a temperature preferably not exceeding about 200° C.; the improvement wherein i) the products of firing the clay-containing material are formed by mixing a first portion of the material that has been heated to a first temperature and a second portion of the material that has been heated to a second temperature which is different from the first temperature, said first and second temperatures being in a range from a temperature of beginning of dehydration to a temperature of sinter of clay and being selected such that said first and second portions have different chemical or physical properties from one another, and ii) the molded body of building product is cured at a temperature not exceeding about 115° C.

8. A method for making building product as claimed in claim 7 wherein the products of firing are placed into a medium of firing gases before molding said body.

9. A method for making building product as claimed in claim 7 wherein the molded body of building product is cured at a temperature within a range of about 100° to 115° C.

10. A method as claimed in claim 7 wherein said first portion of the material has been heated to a temperature between about 500° to 800° C. and the second portion has been heated to a temperature between about 880° to 950° C.

11. A method as claimed in claim 7, wherein the lime is present in the molding mix as an alkaline additive in an amount of about 2 to 30 weight percent.

12. A method as claimed in claim 11, wherein the lime is present in the molding mix in an amount of about 2 weight percent.

13. In a method for obtaining a fired product from clay components for making building products mainly by moist hardening, wherein the method comprises heating a clay-containing material to a temperature of firing the material, the improvement wherein the material is heated to a temperature of firing until a temperature gradient is created in the material with a first portion of the material being heated to a first temperature and a second portion of the material being heated to a second temperature which is different from the first temperature, said first and second temperatures being in a range from a temperature of beginning of dehydration to a temperature of sinter of clay and being selected such that said first and second portions have different chemical or physical properties from one another, and mixing said first and second portions.

14. A method as claimed in claim 13 comprising forming the clay-containing material into a bulk mass comprising said first and second portions, then heating the first portion of said bulk mass to a maximum temperature of firing, which maximum temperature is preferably not lower than a temperature of beginning of sinter of clay, with said heating causing the second portion of the bulk mass to be heated to a different temperature which is below said maximum temperature.

15. A method as claimed in claim 14 wherein said bulk mass is heated from an interior thereof with the second portion of said bulk mass surrounding the first portion of said bulk mass.

16. A method as claimed in claim 15 wherein the second portion of said bulk mass is subjected to a temperature below a temperature of beginning of dehydration of clay.

17. A method as claimed in claim 14, wherein the clay-containing material is heated by (i) mixing the clay-containing material with a solid fuel component to form a mixture; (ii) forming pellets from the mixture, and (iii) firing the pellets by burning said solid fuel component in a kiln.

18. A method as claimed in claim 17, wherein the method comprising drying the pellets formed in step (ii) prior to firing in step (iii), and wherein the kiln comprises a steel sheet.

19. A method as claimed in claim 17, wherein the solid fuel component is present in the pellets in an amount of about 2.5 percent by weight.

20. A method as claimed in claim 17, wherein the solid fuel component is selected from the group consisting of coal, waste from coal recovery and thermal utility waste.

21. A method as claimed in claim 13 wherein said first portion of the material has been heated to a temperature between about 500° to 800° C. and the second portion has been heated to a temperature between about 880° to 950° C.

* * * * *